(12) United States Patent
Lo (10) Patent No.: US 7,566,157 B2
(45) Date of Patent: Jul. 28, 2009

(54) FIBER OPTICS ILLUMINATED GLOW STICK

(76) Inventor: Teddy Yeung Man Lo, 19 Kent Road, Kowloon Tong (HK)

( * ) Notice: Subject to any disclaimer, the term of this patent is extended or adjusted under 35 U.S.C. 154(b) by 140 days.

(21) Appl. No.: 11/259,679

(22) Filed: Oct. 26, 2005

(65) Prior Publication Data

US 2006/0109676 A1 May 25, 2006

Related U.S. Application Data

(63) Continuation-in-part of application No. 10/535,805, filed as application No. PCT/US2004/027848 on Aug. 27, 2004, now Pat. No. 7,293,903.

(60) Provisional application No. 60/566,042, filed on Apr. 27, 2004.

(51) Int. Cl.
*F21V 33/00* (2006.01)

(52) U.S. Cl. .................. 362/577; 362/190; 362/109; 362/555

(58) Field of Classification Search ........... 362/190, 362/191, 109, 555, 565, 577
See application file for complete search history.

(56) References Cited

U.S. PATENT DOCUMENTS

| | | | |
|---|---|---|---|
| 4,600,974 A | 7/1986 | Lew et al. |
| 4,901,209 A | 2/1990 | Nitz |
| 4,996,976 A | 3/1991 | Nakagawa |
| 5,081,568 A | 1/1992 | Dong et al. |
| 5,212,333 A | 5/1993 | Aryee |
| 5,722,757 A | 3/1998 | Chien |
| 5,980,063 A | 11/1999 | Ford et al. |
| 6,238,076 B1 | 5/2001 | Pascale et al. |
| 6,592,240 B2 | 7/2003 | Camarota et al. |
| 6,820,996 B1 | 11/2004 | Fan |
| 2004/0160769 A1 | 8/2004 | Currie et al. |
| 2007/0041174 A1 | 2/2007 | Lo |

FOREIGN PATENT DOCUMENTS

CN 2252934 Y 4/1997

(Continued)

OTHER PUBLICATIONS

Oct. 4, 2006 Supplementary Partial European Search Report issued by the European Patent Office in connection with European Patent Application No. 04782345.5.

(Continued)

*Primary Examiner*—Laura Tso
(74) *Attorney, Agent, or Firm*—Dickstein Shapiro LLP (57) ABSTRACT

The present invention provides a fiber optics illuminated glow stick apparatus comprising at least one multicolored LED, an optics cable in proximity to the multicolored LED that illuminates when the LED is illuminated, a control circuit for controlling the multicolored LED to be illuminated, and a protective cover being mounted to a stick housing and encasing at least a part of the optics cable therein. The present invention also provides a fiber optics illuminated glow stick apparatus comprising a light source, an optics cable in proximity to the light source that illuminates when the light source is illuminated, a control circuit for controlling the light source to be illuminated, and a protective cover that encases the optics cable. The fiber optics illuminated glow stick can glow in a variety of different colors and is reusable and rechargeable. The fiber optics illuminated glow stick may additionally include an LED flashlight.

17 Claims, 6 Drawing Sheets

FOREIGN PATENT DOCUMENTS

| | | | |
|---|---|---|---|
| CN | 2532360 Y | | 1/2003 |
| CN | 2566921 Y | | 8/2003 |
| CN | 2578666 Y | | 10/2003 |
| DE | 196 32 699 | | 2/1998 |
| DE | 19632699 | A1 | 2/1998 |
| EP | 0 899 503 | | 3/1999 |
| EP | 0899503 | A1 | 3/1999 |
| FR | 2 836 579 | | 8/2003 |
| JP | 11-066928 | | 3/1999 |
| JP | 2000090702 | A | 3/2000 |
| JP | 2001021344 | A | 1/2001 |
| JP | 3081186 | | 10/2001 |
| JP | 2002315617 | | 10/2002 |
| JP | 2004014280 | A | 1/2004 |
| RU | 2090941 | | 9/1997 |
| RU | 2185567 | | 7/2002 |
| WO | WO 00/63735 | | 10/2000 |
| WO | WO 02/26555 | | 4/2002 |
| WO | WO 03/102643 | | 12/2003 |
| WO | WO 03/102643 | A1 | 12/2003 |

OTHER PUBLICATIONS

Nov. 9, 2006 PCT Notification Concerning Transmittal of International Preliminary Report on Patentability (Chapter I of the Patent Cooperation Treaty) issued by The International Bureau of WIPO in connection with related PCT Application No. PCT/US2004/027848.

Jan. 17, 2007 Supplementary European Search Report issued by the European Patent Office in connection with European Application No. 04782345.5.

A Mar. 20, 2007 Office Action issued by the U.S. Patent and Trademark Office in connection with related U.S. Appl. No. 10/535,805.

International Search Report dated Mar. 7, 2005 by the International Searching Authority in connection with related PCT International Application No. PCT/US04/27848, filed Aug. 27, 2004.

Written Opinion of the International Searching Authority dated Mar. 7, 2005 by the International Searching Authority in connection with related PCT International Application No. PCT/US04/27848, filed Aug. 27, 2004.

Alice Fok, "Evolution in Art, NYC—Interview with Teddy Lo", Not a Rag, pp. 6-14 (Jun. 2004).

Morphology—Sep. 22-Oct. 19, 2003 Exhibition Poster, http://www.ledartist.com/morphposter_small.jpg. (May 19, 2005).

Jun. 1, 2007 PCT International Search Report and Written Opinion issued by the International Searching Authority in connection with related PCT International Application No. PCT/EP2006/009820.

Anonymous, "Specifications of our Fiber and Cable," Internet Article, © 2001 Fiber Optics Products Inc.; retrieved on Apr. 25, 2007 from Internet URL: http://ww.fiberopticproducts.com/Specs.htm>.

Dec. 11, 2007 Official Action issued by the Patent Office of the Russian Federation in connection with related Russian Patent Application No. 2006138483.

Nov. 27, 2007 Official Action issued by the Japanese Patent Office in connection with related Japanese Patent Application No. 2006-517862.

May 30, 2008 First Office Action issued by China's State Intellectual Property Office in connection with related Chinese patent application No. 20040004358.6.

Oct. 15, 2008 Office Action issued by the Canadian Intellectual Property Office in connection with related Canadian Patent Application No. 2,562,525.

Jan. 16, 2009 Second Office Action issued by the Chinese Patent Office in connection with related Chinese Application No. 200480004358.6 (English translation included).

FIBER OPTICS ILLUMINATED GLOW STICK

CROSS-REFERENCE TO RELATED APPLICATIONS

This is a continuation-in-part of U.S. Ser. No. 10/535,805, filed Jun. 1, 2005, now U.S. Pat. No. 7,293,903 a national stage application of PCT International Application No. PCT/US04/27848, filed Aug. 27, 2004, a continuation and claiming priority to U.S. Ser. No. 60/566,042, filed Apr. 27, 2004.

FIELD OF THE INVENTION

The present invention relates to the field of glow stick units and, more particularly, to an LED and/or fiber optics illuminated glow stick.

BACKGROUND OF THE INVENTION

A glow stick is commonly known to be a small plastic tube filled with luminescent chemicals. When mechanically activated, chemical-based glow sticks will glow brightly, generally emitting a single vibrant color that is readily visible, especially in the dark.

Chemical-based glow sticks are activated by initiating a light-emitting chemical reaction within the unit, generally by bending the flexible plastic tube thereby breaking apart fragile partitions within the tube and allowing various chemicals to react. Once the chemical reaction has begun, it cannot be stopped until it has gone to completion. Chemical-based glow sticks will continue to emit light for some determinable length of time, generally on the order of several hours, after which time the glow stick will be exhausted and will no longer emit light. Exhausted chemical-based glow sticks cannot be recharged and are generally discarded after the single use.

Because of their ability to glow brightly in a vibrant color, glow sticks are very useful as safely devices for vehicles and pedestrians, especially when used at night. Moreover, glow sticks may also be highly entertaining and are commonly used as, or incorporated into, toys and novelty devices.

Although useful and entertaining, chemical-based glow sticks can only be used once after which they must be discarded. Disposable products such as chemical-based glow sticks exacerbate the growing global problem of managing excess waste. Moreover. because they are composed of plastics and liquid chemicals, chemical-based disposable glow sticks can be easily perceived as an environmental threat. Moreover, because chemical-based glow sticks cannot be repeatedly activated and deactivated, they are not well suited for incorporation into signs and other devices, such as bicycles and automobiles.

While glow sticks come in a variety of colors, a single glow stick is only capable of glowing in one color. This characteristic limits the utility and entertainment value of the device.

Electroluminescent lights are similar to glow sticks. Electroluminescent lights are generally made from glass tubes that are filled with an electroluminescent gas. When an electric current is applied, these lights glow brightly. By varying the gas used and the phosphor coating applied to the surface of the tube, electroluminescent lights can be produced that glow in a number of vibrant colors. For example, neon lights glow bright red, while fluorescent lights glow bright white.

Because electroluminescent lights can be activated and deactivated, they are well suited for lighted signs and incorporate well into other devices, such as automobiles. Electroluminescent lights are not, however, well suited for emergency use or as toys. Electroluminescent lights generally require high voltages to stimulate the electroluminescence effect. To generate these high voltages, large and relatively heavy power converters or transformers are generally required. These power converters render electroluminescent lights poorly suited for incorporation into small portable devices. Moreover, because of their relatively high-voltage and high-power consumption electroluminescent lights are not well suited for being powered by small batteries. Electroluminescent lights are also generally constructed from glass tubes. This feature, and the fact that electroluminescent lights generally require high voltage, makes them too dangerous for use as toys.

A glow stick can be used as a safety device, a toy, and as a decorative accent when incorporated into another device. For example, a glow stick can be used at night by police to direct traffic, by a distressed vehicle to signal caution to passing motorists, and by pedestrians and cyclists on the roads at night. Glow sticks can be used as a toy by young and old children, especially in dark places. Glow sticks can be mounted to automobiles and inside computers to create an eye-catching accent.

Chemical-based glow sticks manufactured from plastic tubes filled with chemicals have the disadvantages of being single-use and must be disposed of thereafter. In addition to not being environmentally friendly, these glow sticks are frequently manufactured using toxic chemicals, thereby rendering them unfit for use by children. Moreover, these chemical-based glow sticks can not be turned on and off or made to blink. Moreover, while chemical glow sticks can be manufactured in several different colors, a single glow stick is limited to glowing in one fixed color. These shortcomings of the chemical-based glow stick limit their entertainment value, as well as their usefulness as a safety device.

Electroluminescent lights generally are manufactured from glass and require a high voltage to operate. As a result, such devices are generally heavy fragile and create a risk of high-voltage electric shock and laceration by broken glass. These devices are therefore not well suited for portable use or battery operation. Moreover, these devices are also generally unfit for use by children.

OBJECT AND SUMMARY OF THE INVENTION

Accordingly, it is an objective of the present invention to provide an LED and/or fiber optics illuminated glow stick apparatus. The LED illuminated glow stick apparatus comprises at least one multicolored LED, an optically transmitting tube that illuminates when the multicolored LED is activated, control circuitry for controlling the multicolored LEDs to illuminate in multiple colors, and a soft cushion that encases the optically transmitting tube, wherein the soft cushion is at least partially transparent. In the alternative, the fiber optics illuminated glow stick apparatus comprises a light source, an optics cable in proximity to the light source that illuminates when the light source is illuminated, a control circuit for controlling the light source to be illuminated, and a protective cover that encases the optics cable.

It is another objective of the present invention to provide an LED and/or fiber optics illuminated glow stick apparatus additionally comprising an LED flashlight.

DETAILED DESCRIPTION OF PREFERRED EMBODIMENTS

According to one embodiment, the present invention provides an LED illuminated glow stick that is reusable, rechargeable, capable of generating multiple colors, capable of flashing in multiple patterns, capable of being deactivated and reactivated, capable of functioning as an LED flashlight and that is portable and fit for use by children. Moreover, the LED illuminated glow sticks according to the present invention can be interlocked with one another to enhance their safety and entertainment value.

Figure 1:
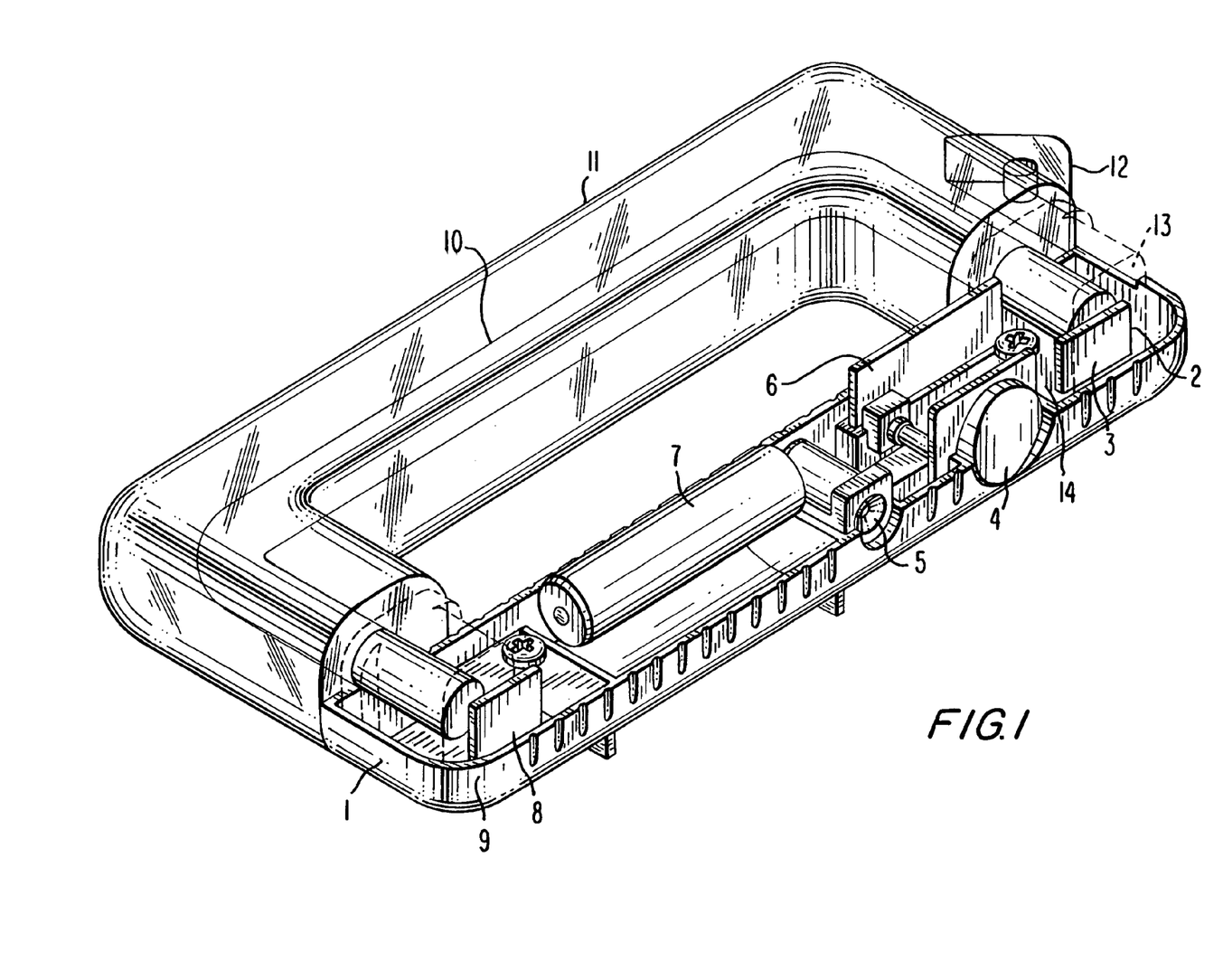
FIG. 1 is a perspective view partially in phantom of an LED glow stick in accordance with one embodiment of the present invention.

FIG. 1 shows an LED illuminated glow stick according to a preferred embodiment in a phantom view so that the interior of the glow stick can be seen. The handle 1 (or stick housing) can be constructed of a hard material such as ABS plastic and can be covered with a soft grip material such as soft rubber. The handle 1 (or stick housing) can be ergonomically built to adapt to the shape of a hand. This soft grip enhances the handling capability. Moreover, the grip may be ergonomically formed to better receive the shape of a closed hand. The soft character of the handle 1 (or stick housing) also enhances the entertainment value of the device by providing an interesting tactile experience.

A cushion 11 that is at least partially transparent or translucent is attached to the handle 1 (or stick housing) forming a single body in the form of a rectangle, a square or a "D" shape. Cushion 11 can also be formed into linear (e.g., spiked-shaped) and/or non-linear shapes (e.g., corona, wave). The cushion 11 is also formed from a soft material such as silicon, thereby enhancing the tactile experience of the device while also being capable of transmitting light. Such cushion 11 as described immediately above is considered a soft cushion. Within the cushion 11 or soft cushion is a solid light transmitting tube 10. This tube is capable of transmitting light from the LED light sources 2 and 9, so that the whole tube 10 can be illuminated. The tube 10 is formed from a material capable of transmitting light while illuminating, for example, acrylic can be used.

According to one embodiment of the present invention there are two multicolor LEDs 2 and 9, one at either end of the solid tube 10. Each multicolor LED is formed from red, blue, and green LEDs (RGB LEDs) combined together on respective control printed circuit board (PCB) 3 and 8. Each multicolored LED 2 or 9 is capable of generating a plurality of distinct colors by turning on or off various combinations of red, blue, and green. Two multicolored LEDs 2 and 9 are together capable of generating even more colors because each individual color red, blue, and green, can be off, one on, or two on. According to another embodiment of the current invention, more than two multicolored LEDs are used. For example, up to six multicolor LEDs can be used.

The multicolored LEDs 2 and 9 can be mounted on separate LED PCB circuit boards 3 and 8, respectively. These LED PCB circuit boards 3 and 8 are each electrically connected to the control PCB 6 containing control elements, such as an integrated circuit (IC) chip (not shown), by wire connections. Alternatively, the LEDs 2 and 9 and the control elements can be mounted on the same PCB and connected by printed circuit paths. The IC chip is capable of controlling the multicolored LEDs 2 and 9 to produce a plurality of patterns and effects, such as a single still color, a smooth transition or gradient across a range of colors, a strobe of a single color, or a switching from color to color.

A flashlight LED 13 can be built into the handle 1 (or stick housing). This flashlight LED 13 can be used to provide light to see by in dark environments when the use of a flashlight is desired. This flashlight LED 13 may be one or two multicolored LEDs and may be capable of emitting one or more colors. For example, the flashlight LED 13 may emit white light.

A switch button 4 is connected to the control PCB 6 either electrically or mechanically, such that the control IC (not shown) receives a signal when the button is pressed. The button is used to toggle between the plurality of patterns and modes and a power off or standby mode.

Multiple buttons and switches can be used to control the functioning of the glow stick, for example, a switch 14 for disconnecting the battery power may be included. This switch 14 may be a toggle switch with multiple positions. According to one embodiment of the present invention, the switch 14 can be a three position toggle switch where the up position activates the flashlight LED 13, the down position activates the transmitting tube 10 and the center position disconnects the battery power.

Power is supplied by one or more batteries 7 located inside the handle 1 (or stick housing), as shown in FIG. 1. These batteries may be removable or nonremovable, and may be rechargeable or non-rechargeable. In one embodiment of the present invention, three AAA sized non-removable rechargeable batteries are used. In another embodiment, a rechargable battery pack, such as a Ni-MH pack, is used.

A power input port 5 can be built into the handle 1 (or stick housing). This power input port 5 receives a low DC voltage that can be used to charge the batteries 7 or to directly power the apparatus.

According to one embodiment of the present invention, a tab 12 extends from the apparatus. The tab 12 contains a hole that can be threaded with a string to be hung, for example, around the neck of a user. Moreover, the apparatus can be attached to a. string and spun to create an amusing light pattern.

Figure 2A:
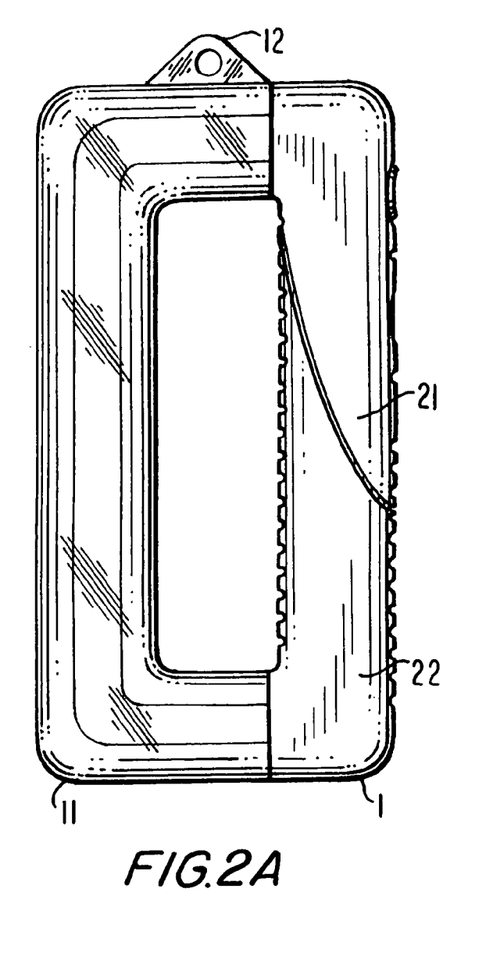
FIGS. 2A, 2B and 2C are perspective views, another perspective view and an elevational view, respectively, of the LED illuminated glow stick shown in FIG. 1.
Figure 2B:
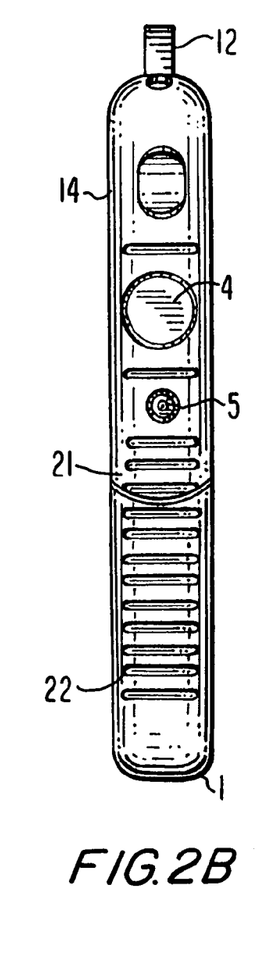
Figure 2C:
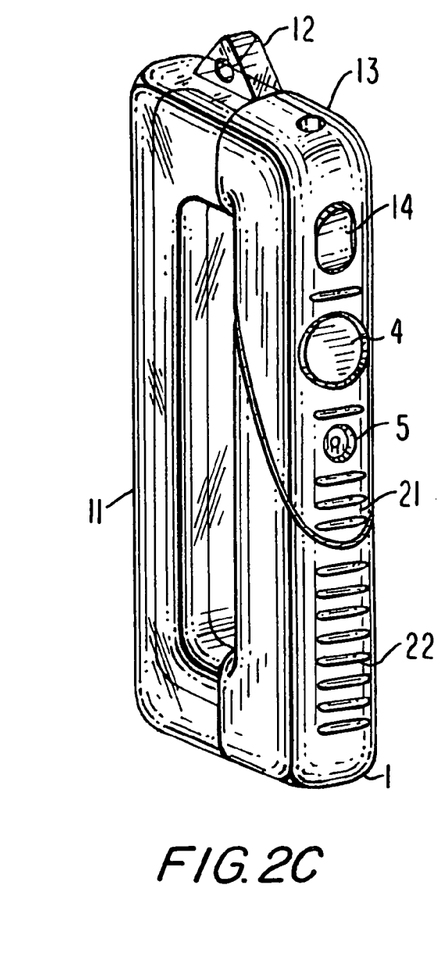

FIGS. 2A, 2B and 2C show additional views of the LED illuminated glow stick shown in FIG. 1. The handle 1 (or stick housing) may consist of a top case section 21 and a bottom case section 22 to facilitate access to the batteries 7.

Figure 3A:
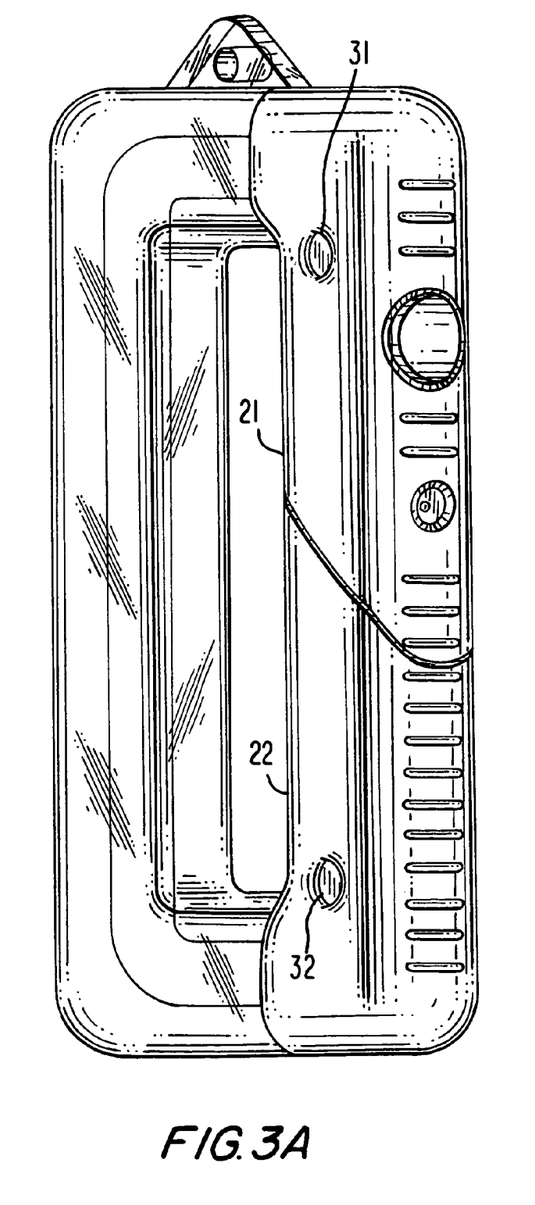
FIGS. 3A and 3B are an elevational view and a perspective view, respectively, of the LED illuminated glow stick shown in FIG. 1.
Figure 3B:
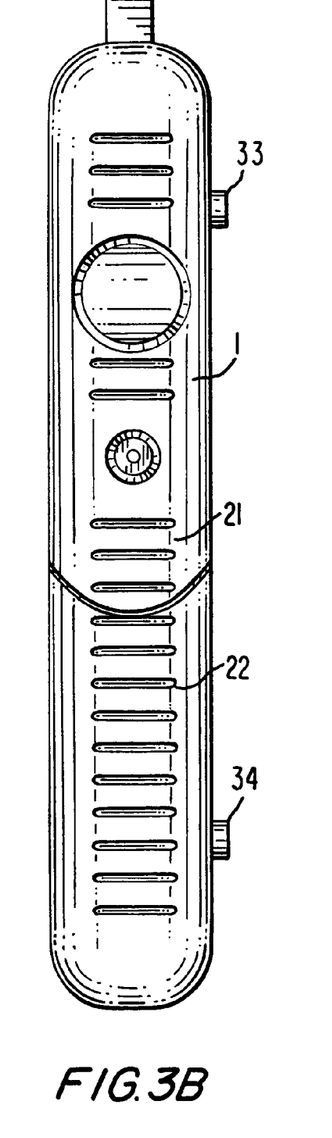

FIGS. 3A and 3B show additional features of the LED illuminated glow stick shown in FIG. 1. FIG. 3A shows a first side of the LED illuminated glow stick that was shown in FIG. 1. Built into the handle 1 (or stick housing) are an upper hole 31 and a lower hole 32. FIG. 3B shows a second side of the LED illuminated glow stick that was shown in FIG. 1. Formed on the handle 1 (or stick housing) are an upper peg 33 and a lower peg 34. The pegs 33 and 34 and holes 31 and 32 are constructed such that a first LED illuminated glow stick according to the present invention can mate with a second LED illuminated glow stick by placing a peg in a hole. In this way, two or more LED illuminated glow sticks can be mated to form a larger and more visually noticeable apparatus, thereby enhancing both the safety and entertainment values of the apparatus.

Figure 4:
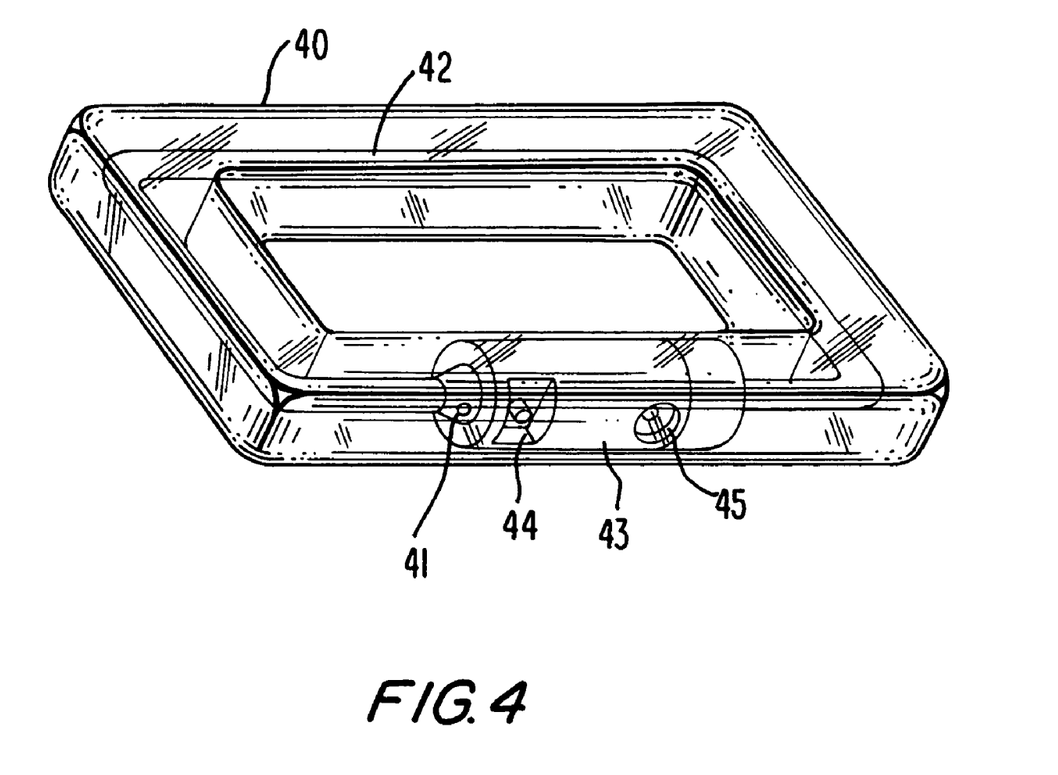
FIG. 4 is a perspective view partially in phantom of an LED glow stick in accordance with a second embodiment of the present invention.

FIG. 4 shows an LED illuminated glow stick according to another embodiment. In this embodiment, a small case 43 contains the control PCB (not shown), the batteries (not shown), a button 44, a DC power input port 45, and one or more multicolored LEDs 41. A transparent or translucent cushion 40 forms a single body shaped as a rectangle, a square, or a "D" shape. The small case 43 is mounted inside the cushion 40, or alternatively, the small case 43 has approximately the same diameter as the cushion 40 and the cushion is attached to the case 43 at each end. The cushion 40 is formed from a soft material, such as silicon, thereby enhancing the tactile experience of the device while being capable of transmitting light. Such cushion 40 as described immediately above is considered a soft cushion. Within the cushion 40 or soft cushion is an optical transmitter 42. This optical transmitter is capable of transmitting light from the LED light sources 41 throughout the body of the optical transmitter 42 so that the whole optical transmitter can be illuminated. The optical transmitter 42 is formed from a material capable of transmitting light white being illuminated, for example, acrylic can be used.

Figure 5:
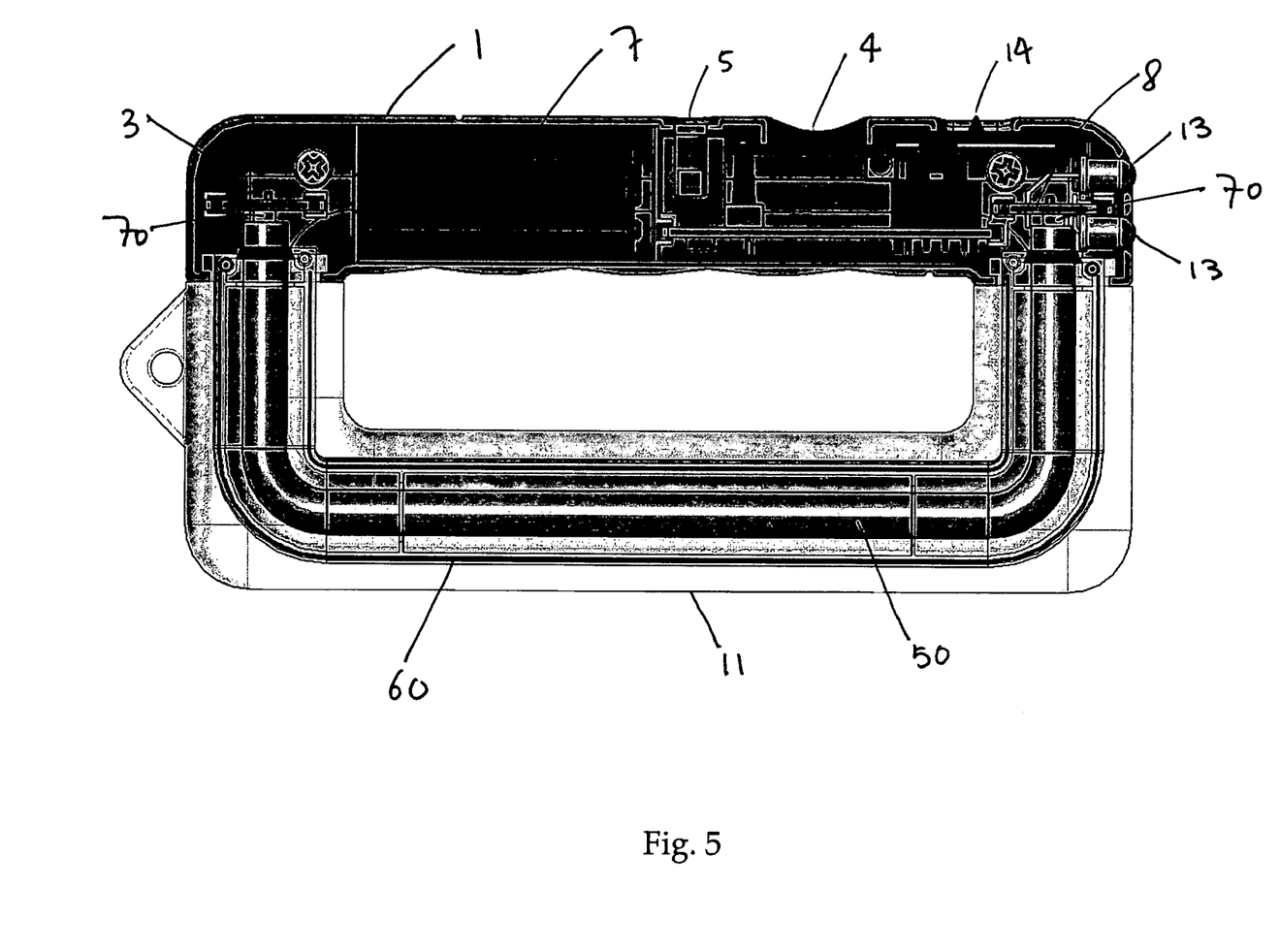
FIG. 5 is a phantom elevational view of a fiber optics illuminated glow stick in accordance with another embodiment of the present invention.
Figures 6A, 6B, 6C, 6D, 6F:
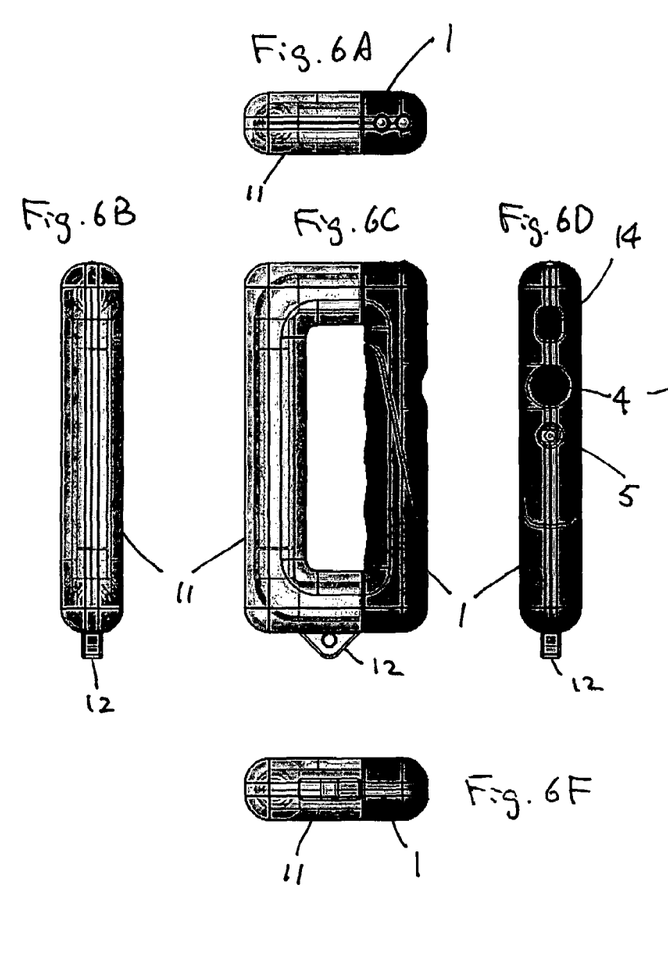
FIGS. 6A to 6F are elevational views of the fiber optics illuminated glow stick shown in FIG. 5.
Figure 6E:
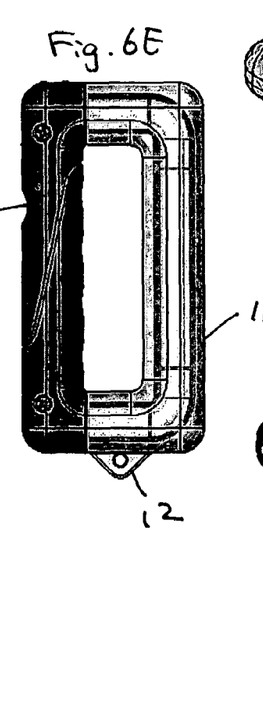
Figure 7A:
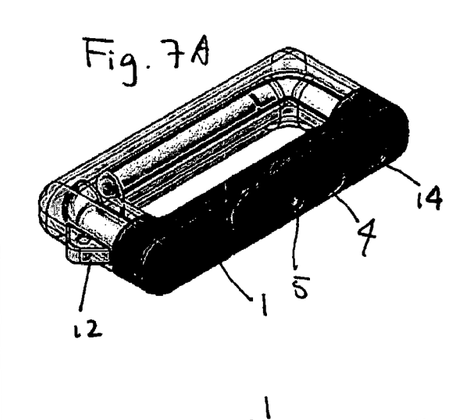
FIGS. 7A and 7B are perspective views of the fiber optics illuminated glow stick shown in FIG. 5.
Figure 7B:
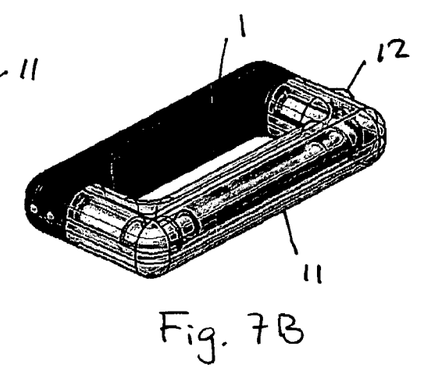

FIGS. 5 to 7 show a fiber optics illuminated glow stick according to a second preferred embodiment of the present invention. In this preferred embodiment, the light transmitting tube 10 can comprise a fiber optics device, such as an optics cable 50 as shown in FIG. 5. The optics cable 50 can be formed in various manners. In one embodiment, the optics cable 50 can have an optical core, such as a solid optical gel core made of optically pure case acrylic monomers (e.g., MMA) to ensure flexibility and enhanced light transmission. The optical core can be clad in a sheath of clear material, such as Teflon. The optics cable 50 can have various dimensions, such as a diameter of about 7.0 mm with a variation of 0.4 mm. In an alternative embodiment, the optics cable 50 can be made of one or multiple strands of fiber optics (not shown). The fiber optics can be held together to form a signal core by various methods, such as sonic welding.

In one embodiment, the optics cable 50 can be formed as a sidelight fiber optics cable, which allows light to be partially or entirely transmitted through the cable cladding material. The optics cable 50 can be formed to have various optical chracteristics, such as the following:

Spectral Range: about 370 NM to about 690 NM (i.e., visible wavelength range);
Acceptance Angle: about 45 Degrees;
Numerical Aperture: about 0.68;
Glass Transition Temperature: about 53.8° C.; and/or
Attenuation: Less than 3% per meter.

The optics cable 50 can be be mounted in the glow stick in various manners. In one embodiment, the optics cable 50 can have its ends ultrasonically welded inside a housing made of tough engineering plastic material, such as polycarbonate. In another embodiment, a protective cover 60 can be provided, in which the optics cable 50 is placed within protective cover 60. The protective cover, which may be clear, can be formed and mounted onto the handle 1 (or stick housing) in various conventional manners.

A light source 70, such as one or more LEDs described above, can be directly mounted at the ends of the optics cable 50 to create light effects. In one embodiment, a three-in-one (RGB) SMT LEDs can be mounted at each end of the optics cable 50 to create colored lighting effects. It will be appreciated that various other types of light sources, such as other LEDs (e.g., quantum dot LED), cold cathodes, electroluminescence, fluorescence, can also be used to create light effects. In one embodiment, the light source can be encased in protective cover 60 (not shown).

It is to be understood that the foregoing is presented by way of example only and that many variations and adaptations may be made by one with skill in the art, so that the scope of the invention is limited only by the appended claims.

What is claimed is:

1. A fiber optics illuminated glow stick apparatus comprising:
at least one multicolored LED;
an optics cable in proximity to said multicolored LED that illuminates when said multicolored LED is illuminated;
a control circuit for controlling said multicolored LED to be illuminated, wherein said control circuit is encased in a handle; and
a protective cover being mounted to said handle and encasing at least a part of said optics cable therein;
wherein said multicolored LED is mounted on a printed circuit board ("PCB") that is electrically connected to said control circuit, and said fiber optics illuminated glow stick apparatus is in a shape of a rectangle, a square, or a "D".

2. The fiber optics illuminated glow stick apparatus according to claim 1, wherein at least one multicolored LED comprises two multicolored LEDs with one of said two multicolored LEDs placed at each end of said optics cable.

3. The fiber optics illuminated glow stick apparatus according to claim 1, wherein said control circuit controls said multicolored LED to illuminate said optics cable to produce a smooth transition across a range of colors.

4. The fiber optics illuminated glow stick apparatus according to claim 1, wherein said control circuit controls said multicolored LED to continuously illuminate said optics cable in any one of a plurality of colors.

5. The fiber optics illuminated glow stick apparatus according to claim 1, wherein said control circuit controls said multicolored LED to strobe said optics cable in any one of a plurality of colors.

6. The fiber optics illuminated glow stick apparatus according to claim 1, wherein said control circuit controls said multicolored LED to strobe said optics cable while switching between a plurality of colors.

7. The fiber optics illuminated glow stick apparatus according to claim 1, further comprising a soft cushion that encases said optics cable, wherein said soft cushion being at least partially transparent.

8. The fiber optics illuminated glow stick apparatus according to claim 1, additionally comprising a mechanism for interlocking with another fiber optics illuminated glow stick.

9. The fiber optics illuminated glow stick apparatus according to claim 1, wherein said handle houses at least one multicolored LED.

10. The fiber optics illuminated glow stick apparatus according to claim 1, wherein said handle is ergonomically formed to receive the shape of a closed hand.

11. The fiber optics illuminated glow stick apparatus according to claim 1, wherein said handle is soft.

12. The fiber optics illuminated glow stick apparatus according to claim 1, additionally comprising a tab attached to said fiber optics illuminated glow stick apparatus with a hole in said tab for hanging said apparatus from a string.

13. The fiber optics illuminated glow stick apparatus according to claim 1, additionally comprising an LED flashlight.

14. A fiber optics illuminated glow stick apparatus comprising:

at least one multicolored light source;

an optics cable in proximity to said multicolored light source that illuminates when said multicolored light source is illuminated;

a control circuit for controlling said multicolored light source to be illuminated, wherein said control circuit is encased in a handle; and a protective cover that encases said optics cable;

wherein said multicolored light source is mounted on a printed circuit board ("PCB") that is electrically connected to said control circuit, and said fiber optics illuminated glow stick apparatus is in a shape of a rectangle, a square, or a "D".

15. The fiber optics illuminated glow stick apparatus according to claim 1 or 14, wherein said optics cable comprises a solid optical gel core.

16. The fiber optics illuminated glow stick apparatus according to claim 1 or 14, wherein said optics cable comprises multiple strands of fiber optics.

17. The fiber optics illuminated glow stick apparatus according to claim 1 or 14, wherein said optics cable has its ends ultrasonically welded inside said handle.

* * * * *